L. PRATT.
LAWN MOWER.
APPLICATION FILED APR. 25, 1917.
1,241,762.
Patented Oct. 2, 1917.
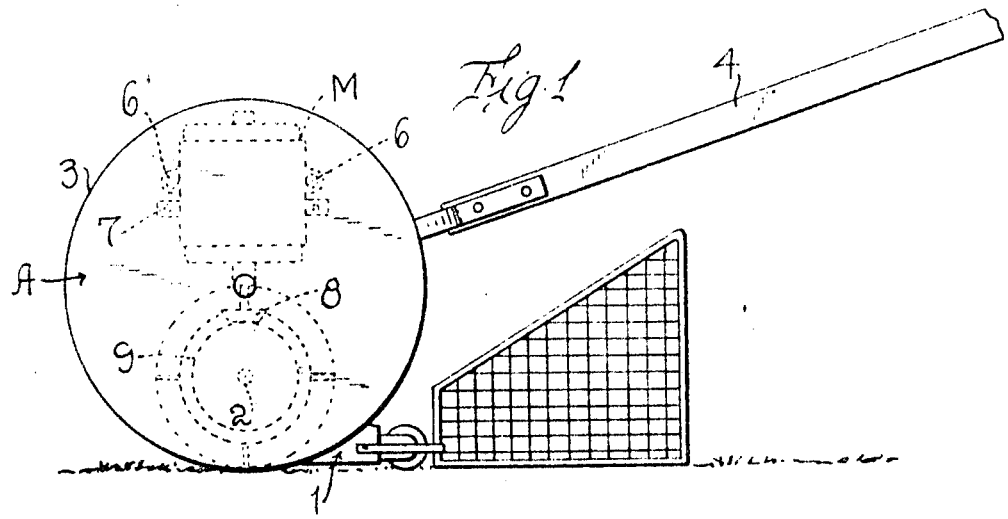
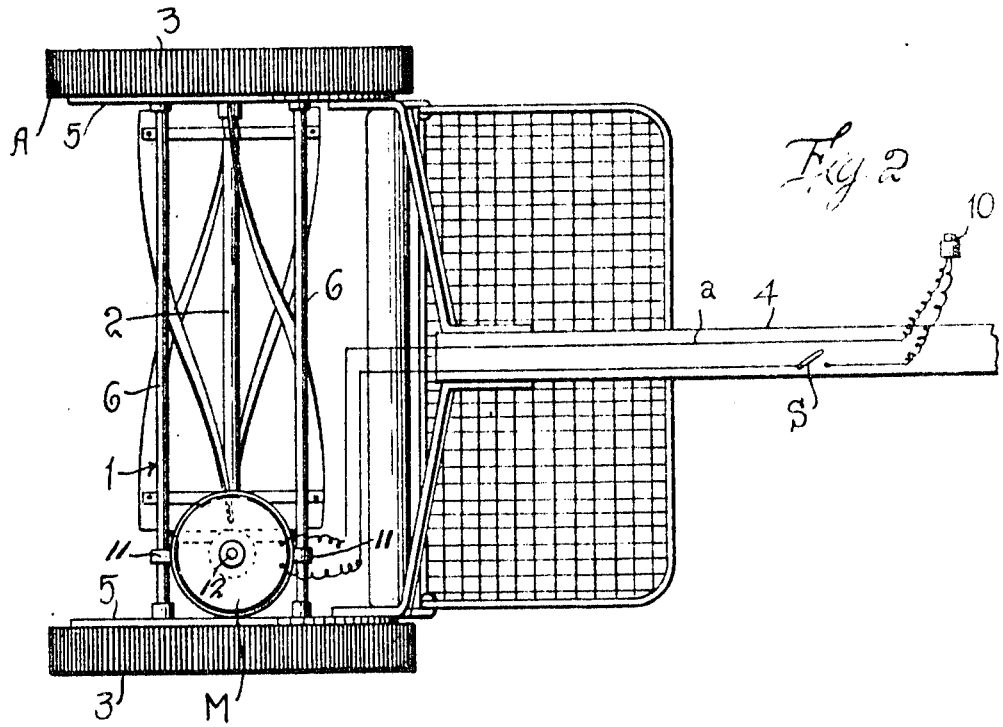
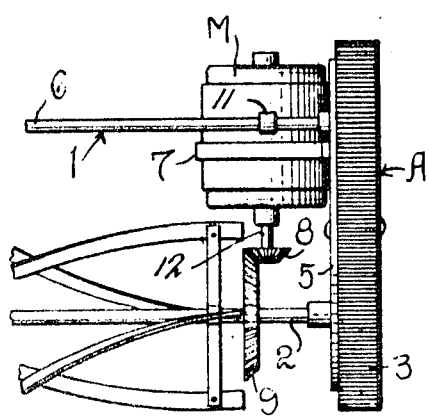
Inventor
LENORA PRATT
By Watson E. Coleman
Attorney

UNITED STATES PATENT OFFICE.

LENORA PRATT, OF VISALIA, CALIFORNIA.

LAWN-MOWER.

1,241,762.  Specification of Letters Patent.  Patented Oct. 2, 1917.

Application filed April 25, 1917. Serial No. 164,454.

*To all whom it may concern:*

Be it known that I, LENORA PRATT, a citizen of the United States, residing at Visalia, in the county of Tulare and State of California, have invented certain new and useful Improvements in Lawn-Mowers, of which the following is a specification, reference being had to the accompanying drawings.

This invention relates to certain improvements in lawn mowers and it is an object of the invention to provide a device of this general character having novel and improved means whereby the knife reel may be positively driven independently of the supporting or traction wheels of the mower.

It is also an object of the invention to provide a device of this general character having novel and improved means whereby the knife reel is positively driven independently of the supporting or traction wheels through the medium of a motor supported by the frame of the mower.

The invention consists in the details of construction and in the combination and arrangement of the several parts of my improved lawn mower whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in side elevation of a mower constructed in accordance with an embodiment of my invention, certain of the parts being indicated in dotted lines;

Fig. 2 is a view in top plan of the mower as herein embodied with the electric connections diagrammatically indicated; and Fig. 3 is a fragmentary view in front elevation illustrating the operative connection between the reel and the mower.

As disclosed in the accompanying drawings, M denotes a mower of any ordinary or preferred construction and which comprises the frame 1, the knife reel shaft 2, the supporting wheels 3, and the handle 4.

The wheels 3 are mounted upon the ends or heads 5 of the frame 1 in a conventional manner, and said heads or ends 5 at a point above and in advance of the knife reel shaft 2 are connected by the spaced parallel rods 6 positioned above the reel shaft 2. Extending between the rods 6 and secured thereto is the electric motor M of any ordinary or preferred type. The rods 6 are disposed through the laterally directed ears 11 carried by the motor M. The motor M is positioned in close proximity to an end or head 5 of the frame 1 and is secured thereto through the medium of the clamping iron 7.

The drive shaft 12 of the motor M is vertically disposed and has its lower end portion provided with the gear 8 in mesh with the gear 9 affixed to the reel shaft 2 whereby it will be perceived that the motor M will be caused to impart the requisite rotation to the shaft. It is to be noted that the gears 8 and 9 are of a ratio substantially 3 to 1 so that the rotation of the shaft 2 relative to the drive shaft of the motor M may be materially reduced.

In electrical connection with the motor M are the conductors $a$ which are extended upwardly of the handle 4 and interposed in one of said conductors is a switch S of a conventional type. The conductors $a$ are of any predetermined length and terminate in a plug 10. The plug 10 is adapted to be inserted within a suitably positioned socket in communication with a source of electrical energy. In practice it is preferred that a plurality of sockets be positioned at different localities so that the requisite energy for the motor M may be readily and conveniently obtained.

From the foregoing description, it is thought to be obvious that a lawn mower constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice, except as hereinafter claimed.

I claim:

1. In combination with a lawn mower including a frame embodying end plates, rods connecting said end plates, a reel rotatably supported by the end plates and positioned below the rods; an electrical motor supported by the rods and an end plate of the frame, said motor including a vertically disposed drive shaft having its lower end portion operatively engaged with the reel, and means for connecting the motor with a suitable source of electrical energy.

2. In combination with a lawn mower including a frame embodying end plates, rods connecting said end plates and a reel rotatably supported by the end plates and positioned below the rods; an electrical motor extending between the rods and provided with laterally directed ears through which said rods are disposed, a strap carried by an end plate and disposed around the motor, the drive shaft of said motor being vertically disposed and having its lower end portion operatively engaged with the reel, and means for connecting the motor with a suitable source of electrical energy.

In testimony whereof I hereunto affix my signature in the presence of two witnesses.

LENORA PRATT.

Witnesses:
JAMES M. BURKE,
VIOLA WILSON.